US012126501B2

(12) United States Patent
Peterson et al.

(10) Patent No.: US 12,126,501 B2
(45) Date of Patent: *Oct. 22, 2024

(54) WAVELENGTH REGENERATION IN A NETWORK

(71) Applicant: Level 3 Communications, LLC, Broomfield, CO (US)

(72) Inventors: Benjamin K. Peterson, Superior, CO (US); Laurel Clark, Broomfield, CO (US)

(73) Assignee: Level 3 Communications, LLC, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/137,709

(22) Filed: Apr. 21, 2023

(65) Prior Publication Data
US 2023/0261949 A1    Aug. 17, 2023

Related U.S. Application Data

(63) Continuation of application No. 16/449,969, filed on Jun. 24, 2019, now Pat. No. 11,637,757, which is a
(Continued)

(51) Int. Cl.
*H04L 41/22* (2022.01)
*G06Q 10/063* (2023.01)
*H04J 14/02* (2006.01)

(52) U.S. Cl.
CPC ........... *H04L 41/22* (2013.01); *G06Q 10/063* (2013.01); *H04J 14/021* (2013.01);
(Continued)

(58) Field of Classification Search
CPC ..... H04L 41/22; G06Q 10/063; H04J 14/021; H04J 14/0254; H04J 14/0263; H04J 14/0257
See application file for complete search history.

(56) References Cited

U.S. PATENT DOCUMENTS 5,657,142 A    8/1997    Fahim
6,094,417 A    7/2000    Hansen et al.
(Continued)

OTHER PUBLICATIONS

Mayssa Youssef et al., Cross Optimization for RWA and Regenerator Placement in Translucent WDM Networks, Jan. 1, 2010, 14th Conference on Optical Network Design and Modeling, pp. 1-6 (Year: 2010).*

(Continued)

*Primary Examiner* — Tam T Tran (57) ABSTRACT

An optical network including a plurality of gateway nodes interconnected with a plurality of intermediate nodes with segments of fiber. The network includes a plurality of devices, such as reconfigurable optical add drop multiplexers, optimally placed at various nodes throughout the network. The device placement is optimized with an integer linear programming analysis considering span definition such that any given span involves some number of segments not exceeding a number of segments that would require wavelength regeneration, cost of placement of a device at a given node, cost of wavelength regeneration, and various parameters and constraints.

6 Claims, 5 Drawing Sheets

Related U.S. Application Data continuation of application No. 14/692,532, filed on Apr. 21, 2015, now Pat. No. 10,333,796, which is a continuation of application No. 13/225,712, filed on Sep. 6, 2011, now Pat. No. 9,014,022.

(60) Provisional application No. 61/413,936, filed on Nov. 15, 2010.

(52) U.S. Cl.
CPC ...... H04J 14/0254 (2013.01); H04J 14/0263 (2013.01); *H04J 14/0257* (2013.01)

(56) References Cited

U.S. PATENT DOCUMENTS

| | | | |
|---|---|---|---|
| 6,718,141 | B1 | 4/2004 | deVette |
| 6,798,752 | B1 | 9/2004 | Pope |
| 6,842,723 | B2 | 1/2005 | Alicherry et al. |
| 6,870,813 | B1 | 3/2005 | Raza et al. |
| 6,909,700 | B1 | 6/2005 | Benmohamed et al. |
| 8,571,415 | B1* | 10/2013 | Rider ............... H04J 14/0246 398/175 |
| 2001/0043771 | A1 | 11/2001 | Iraschko |
| 2002/0036988 | A1 | 3/2002 | Cardwell |
| 2003/0020977 | A1 | 1/2003 | Smith |
| 2003/0152072 | A1 | 8/2003 | Guild et al. |
| 2005/0025501 | A1 | 2/2005 | Bickham |
| 2005/0068968 | A1 | 3/2005 | Ovadia |
| 2005/0169196 | A1 | 8/2005 | Carpenter et al. |
| 2005/0197993 | A1 | 9/2005 | Korotky |
| 2005/0243738 | A1 | 11/2005 | Zolfaghari |
| 2006/0023641 | A1 | 2/2006 | Nakashima |
| 2006/0067694 | A1* | 3/2006 | Nozu ............... H04J 14/0284 398/83 |
| 2008/0159742 | A1 | 7/2008 | Krihnaswamy |
| 2009/0028559 | A1* | 1/2009 | Li ..................... H04L 45/12 398/45 |
| 2009/0226172 | A1 | 9/2009 | Larikova et al. |
| 2009/0232497 | A1 | 9/2009 | Archambault et al. |
| 2010/0040364 | A1 | 2/2010 | Jenkins et al. |
| 2010/0040365 | A1* | 2/2010 | Kit Leung ........... H04L 41/08 398/26 |
| 2010/0042390 | A1 | 2/2010 | Jenkins |
| 2010/0061722 | A1 | 3/2010 | Hashiguchi |
| 2010/0226650 | A1 | 9/2010 | Segal |
| 2010/0272431 | A1 | 10/2010 | Chen |
| 2011/0052188 | A1 | 3/2011 | Feldman |
| 2012/0123815 | A1 | 5/2012 | Peterson et al. |
| 2015/0229535 | A1 | 8/2015 | Peterson et al. |
| 2019/0319857 | A1 | 10/2019 | Peterson |

OTHER PUBLICATIONS

Kostas Katrinis et al., Impairment-Aware WDM Network Dimensioning with Optimized Regenerator Placement, Mar. 1, 2009, Conference on Optical Fiber Communication. pp. 1-3 (Year: 2009).*

Canadian Examination Report, dated Jul. 5, 2017, Application No. 2,816,425, filed Nov. 9, 2011; 4 pgs.

Canadian Examination Report, dated Jun. 15, 2018, Application No. 2,816,425, filed Nov. 9, 2011; 4 pgs.

Extended European Search Report, dated Mar. 22, 2016, Application No. 11842270.8, filed Nov. 9, 2011; 9 pgs.

International Preliminary Report on Patentability, mailed May 30, 2013, Int'l Appl. No. PCT/US11/060009, Int'l Filing Date Nov. 9, 2011, 8 pgs.

International Search Report, Intl Appl. No. PCT/US11/60009, Intl Filing Date Nov. 9, 2011, 3 pgs.

Written Opinion, Intl Appl. No. PCT/US11/60009, Intl Filing Date Nov. 9, 2011, 6 pgs.

Montgomery, D et al., "CAD Tools in Optical Network Design", *Optical Networks Magazine* XP000869816; vol. 1, No. 2 Apr. 1, 2000, pp. 59-74.

Nag, A et al., "Transparent vs. Translucent Optical Network Design with Mixed Line Rates", *Optical Fiber Communication* includes post deadline papers; Conference on, IEEE, Piscataway, NJ; XP031468033 Mar. 22, 2009, pp. 1-3.

Yetginer, E et al., "Regenerator Placement and Traffic Engineering with Restoration in GMPLS Networks", *Photonic Network Communications* vol. 6, No. 2; XP019214500 Jan. 1, 2003 , pp. 139-149.

Zang, H et al., "Methodologies on Designing a Hybrid Shared-Mesh Protected WDM Network with Sparse Wavelength Conversion and Regeneration", *Optomechatronic Micro/Nano Devices and Components III* Oct. 8-10, 2007: Proceedings of SPIE, vol. 4910; XP009139109 Sep. 1, 2000, pp. 188-196.

* cited by examiner

→ = Wavelength Span

● = ROADM Node
(regeneration opportunity)

● = Non-ROADM Node
(usually an amplifier site)

Maximum Wavelength
Travel Distance without
←——— Regeneration ———→

Well-placed ROADMs – requires 2 intermediate regenerations

FIG. 1A

Poorly-placed ROADMs – requires 4 intermediate regenerations

WAVELENGTH REGENERATION IN A NETWORK

TECHNICAL FIELD

Embodiments presently disclosed generally relate to network communications. More specifically, embodiments herein relate to regeneration of wavelengths in a network and the devices associated therewith.

BACKGROUND

Fiber-optic communication involves transmitting information between devices by sending light waves through an optical fiber. Fiber-optic communication systems have revolutionized the telecommunications industry and have played a major role in the evolution of the Internet and the sharing and transmitting of data in general. With numerous advantages over electrical transmission, optical fiber-based communications are replacing copper wire based communications in networks throughout the world.

Wavelength-division multiplexing (WDM) is a technology that combines, or multiplexes, optical carrier signals on a single optical fiber using different wavelengths (colors) of light. Stated differently, data is not only encoded into a wave of light but also into discrete wavelengths. With WDM, the capacity of an optical network can be dramatically increased as each fiber can carry many different wavelengths of light.

Many optical networks, particularly long-haul (i.e., those networks covering vast distances) and metro networks, include a device or service typically referred to as a ROADM (reconfigurable optical add-drop multiplexer). Generally speaking, a ROADM allows traffic in an optical system to be switched, based on the wavelength of an optical signal. So, without converting the optical signal to an electrical one, a particular wavelength of light can be identified and switched between fibers, or otherwise added or removed from a multiplexed wave bundle. Additionally, a ROADM may be used in conjunction with a regeneration device to regenerate various wavelengths as those wavelengths diminish over various distances. At some point the wavelength diminishes to a level that can no longer be used unless it is regenerated.

The capital costs for regeneration are significant since a regeneration card is needed for each individual wavelength (potentially in the hundreds) traveling over a fiber. Additionally, regeneration may be a significant portion of the overall cost of a network. Moreover, power costs, facility costs, maintenance and other costs for high speed regeneration equipment can be substantial.

Placement of ROADMs and regenerators in an optical network has often been ad-hoc and/or overly dependent on geographical locations of metropolitan areas. Hence, for example, when metropolitan areas are relatively close (e.g., less than 800 miles), then redundant and unnecessary ROADMs and/or regenerators may be placed inefficiently too close to each other. Similarly, when ROADMs are placed in the network, they may add noise to the fiber, requiring more frequent regenerations. For example, ROADMs placed in a network to service a particular customer circuit or circuits, such as in various metropolitan areas, may degrade the other signals that must pass through the ROADM but may not require regeneration. Thus, inefficiently placed ROADM and regeneration devices may have substantial impacts on a fiber network.

It is with these problems and issues in mind, amongst others, that various aspects of the present disclosure were developed.

SUMMARY

An aspect of the present disclosure involves a computer-implemented method for optimizing placement of devices at nodes in a network. The computer-implemented method, using at least one processor, comprises identifying a plurality of spans in a network that can be traversed by a wave without intermediate regeneration. The method further involves identifying a cost associated with placement of a device at a given node in the network and identifying a cost associated with wavelength regeneration in the network. For each given span, the method involves identifying: (a) a maximum number of intermediate nodes for the given span; and, (b) a maximum bandwidth for the given span based on a maximum number of wavelengths for the given span and a maximum wavelength bandwidth. The method further involves specifying a constraint such that if a given span is to carry traffic, the given span may not: (a) have more than the identified maximum number of intermediate nodes for the given span; and (b) carry more than the maximum bandwidth for the given span. The method additionally involves specifying a constraint such that each given span used to carry traffic has a device placed at each node endpoint of the given span. The method applies at least one first linear programming model to a forecasted traffic demand, the identified spans, the identified costs associated with placement of a device at each given node, the identified cost associated with wavelength regeneration in the network, and the one or more specified constraints. From the model, the method identifies one or more nodes in the network at which a device should be placed to handle the forecasted traffic demand and optimize the number of devices to be added to the network.

Aspects of the present disclosure also involve an optical network implemented in accordance with the above-described method. Aspects of the present disclosure also involve a tangible computer readable media including computer executable instructions that when executed by a processor implement the above-described method.

BRIEF DESCRIPTION OF DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale; emphasis instead being placed on illustrating the principles of the invention.

DETAILED DESCRIPTION

Aspects of the present disclosure involve systems, methods and apparatuses to optimally place network devices or a group of network devices, such as ROADMs and/or regenerators, in an optical network. Another aspect of the present disclosure involves an optical network or portion of a network including optimally placed ROADM and/or regenerator devices. Embodiments disclosed herein further include methods and systems for use in optimal assignment of circuits to waves and waves to fibers in a network.

Oftentimes, a ROADM is placed at any gateway where a circuit enters or leaves a network (e.g., a longhaul network). Stated differently, a ROADM device is placed at the beginning and end of a circuit. A circuit is a connection from one point in the network to another that provides some available bandwidth to transmit data and information between the points. Oftentimes, a network provider provides a specific circuit to a customer based on an order. A ROADM is also typically needed wherever a wavelength requires regeneration (e.g., every 1000-2000 km, depending on fiber quality). In the case of regeneration, a ROADM device diverts or otherwise routes optical signals from the fiber to the regenerators that regenerate the various wavelengths and then the ROADM device places the regenerated wavelength back onto the fiber. A regenerator (also sometimes referred to as a repeater), which may include an optical-electrical-optical (OEO) repeater, regenerates an optical signal (wavelength) by converting the optical signal to an electrical signal, processing the electrical signal (amplification, noise filtering, error correction, etc.) and then reconverting the electrical signal back to optical. Typically, a regenerator is required for each wavelength. During general network operation, the regeneration costs typically outweigh ROADM costs, and often significantly outweigh ROADM costs. Therefore, it is advantageous to have ROADMs placed so that wavelengths can regenerate as close as possible to their distance limits.

Figure 1A:
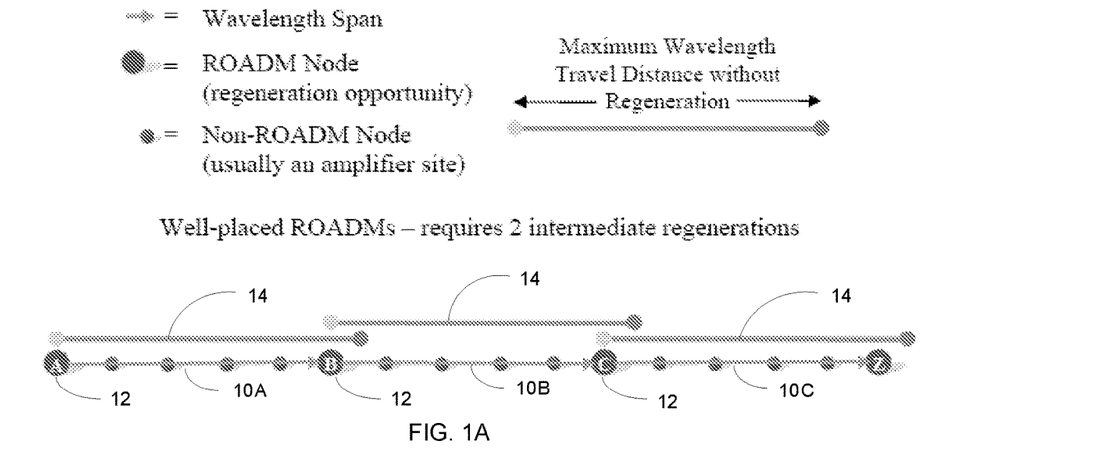
FIG. 1(a) is a diagram illustrating a portion of a network including optimally placed ROADM devices.
Figure 1B:
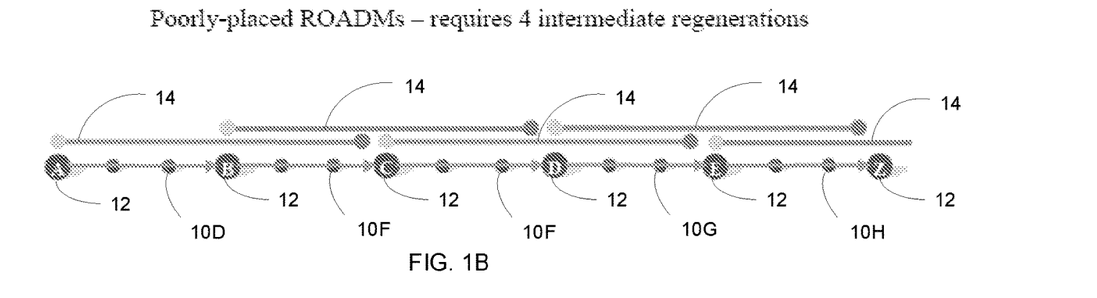
FIG. 1(b) is a diagram illustrating a portion of a network including non-optimally placed ROADM devices.

FIG. 1A, illustrates an example of well-placed ROADM/regenerator devices reducing costs compared to the poorly-placed ROADM/regenerator devices illustrated in FIG. 1B. The diagrams illustrate a series of wavelength spans 10 between nodes 12 along the network that include a ROADM. FIG. 1(A) shows a case where ROADM devices 12 are optimally placed along the network at about the maximum distance 14 that a wavelength can travel without regeneration. In this example, four ROADM devices are placed forming three wavelength spans 10A, 10B, 10C. FIG. 1(B) shows a case where ROADM devices are suboptimally placed along a network. In this example, the same length of network as shown in FIG. 1(A) is serviced by six ROADM devices 12, forming five wavelength spans 10D-10H. In comparing the wavelength spans to the maximum travel distance for a wavelength without regeneration 14, it can be seen that, while such a network is certainly functional, two additional unnecessary ROADM devices are included along the length of network.

Generally, one tradeoff of adding ROADM devices to a network is that the additional ROADM devices slightly degrade all signals passing through them, whether regenerated or not. As a result, the signals affected by the additional ROADM devices need to be regenerated sooner than they otherwise would. However, the addition of more ROADMs to a network results in more regeneration opportunities (i.e., more points in the network where a regenerator may be placed), which tends to reduce regenerations added in the network because there are more opportunities to regenerate before exceeding a length limit. On the other hand, the addition of more ROADMs in a network also causes more signal degradation, which can result in the need for more regenerations in the network. Thus, optimal ROADM and regeneration placements in the network alleviate such tradeoffs and help minimize or otherwise reduce the costs compared to suboptimal solutions.

Figure 2:
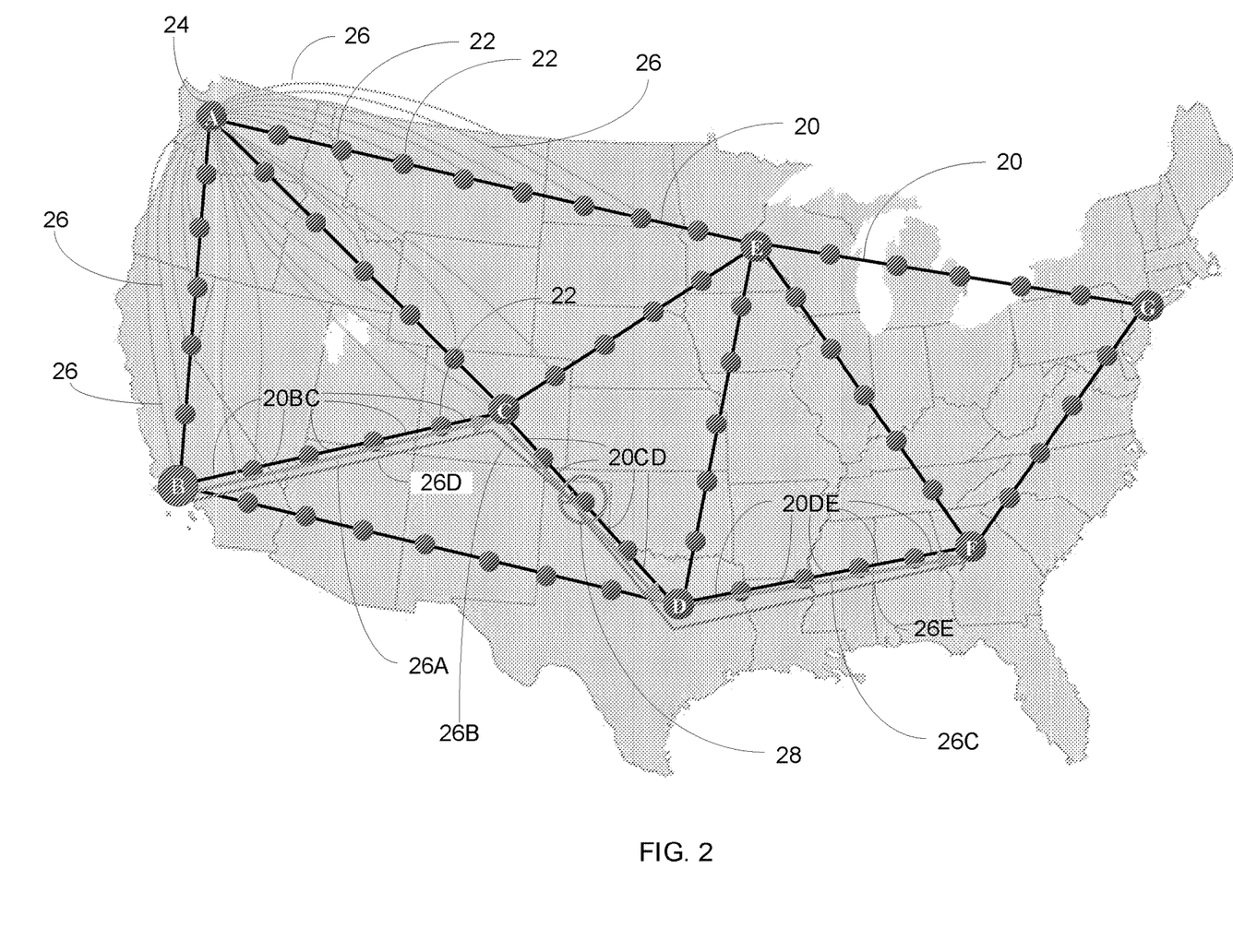
FIG. 2 is a diagram illustrating an example network to which aspects of the present disclosure may be applied.

In one example embodiment, ROADM placement for a complete network topology that includes gateways, amplifier huts and fiber connections, is determined. A network as discussed herein includes one or more gateway devices, ROADM devices, which may be located at amplifier hut locations and gateways, and fiber interconnecting such devices. The network may be in a long haul configuration or some portion of such a configuration. For reference, FIG. 2 is a diagram depicting a network topology that includes a plurality of gateways A-G interconnected by segments of fiber 20. An amplifier hut 22 is a physical structure typically suitable to house and provide the infrastructure to support telecommunications and networking equipment. Amplifier huts often exist at points along a network (e.g., approximately every 100 km) and provide a suitable location to place and operate a ROADM device. It is also possible, such as when first deploying a network, to place dedicated or multipurpose infrastructure, such as amplifier huts, at places along a network dictated, at least in part, on optimal ROADM placement.

The network may include a large set of circuits representing the demand forecast to be transported on the network (e.g., demand for network traffic, wavelengths, etc.). According to this example embodiment, each circuit is specified by a start point, an end point, and a bandwidth requirement. Further, it is assumed that each gateway (e.g., gateways A-G) has a ROADM device so that each gateway can add and drop network traffic, and that each amplifier hut 22 may or may not be equipped with a ROADM. Each gateway and each amplifier hut represents a node in the network for purposes of this discussion, with segments 20 being sections of fiber between the nodes. As such, ROADM device placement in the network is optimized (e.g., to minimize cost) by specifying: i) which amplifier huts should be equipped with ROADMs, and ii) the location of wavelength regenerations, in this example.

1. Models

Continuing with the example embodiment above, one or more integer linear programming models may be employed to solve the problem of optimal placement of ROADM devices in a network. Generally speaking, linear programming is a mathematical method for determining a way to achieve some optimal outcome for a complex system. In some cases, linear programming may be limited to the use of integer values in which case the term integer linear programming is used. A linear programming model typically includes four components: variables, parameters, an objective function and constraints. Variables represent the controllable factors that the model solves for, which in this example include the nodes that will include a ROADM device. Parameters represent identifiable data that affect the model or are otherwise factors in solving the problem, such as the cost of placing a ROADM at a node or the start node of a circuit. The objective function quantifies the goal of the model. In this case, for example, Model A minimizes the total cost of ROADMs and wavelength regenerations in the network while Model B determines the wavelengths carried on each network span. Constraints represent requirements to which the model conforms, such as that all gateway nodes include a ROADM. Stated differently, constraints represent requirements needed for a feasible solution.

In the present case, two linear programming models are employed: (i) Model A determines ROADM placement and regeneration locations, and ii) Model B assigns circuits to specific wavelengths.

1.1. Model A: ROADM and Regeneration Model

In preparation for the application of Models A and B, the system may first apply column generation to obtain a list of all possible network spans. More particularly column generation involves the technique of enumerating large numbers of partial solutions to a problem, in this case chains of segments referred to herein as "spans". Rather than letting the models build their own spans from the segments, column generation precomputes all possible spans and the models choose among them. Although column generation models use many more variables, they often have much simpler constraints and very few non-zeros in their optimal solution, which tends to make them easy to solve.

More particularly, the system, such as a computing system described below with reference to FIG. 3, initially generates a list of all spans (chains of fiber segments) in the network which can be traversed by a wave without intermediate regeneration. A segment or fiber segment 20 is a section of optical fiber extending between nodes 22/24 in the network. A node is point in the network where sections of fiber are connected to some form of network equipment including gateways, ROADM devices, regeneration devices, routers, switches, and the like. In the present example, nodes of interest are primarily those including a gateway 24 or an amplifier hut 22 where ROADM and regeneration devices may be located, but other nodes may also be relevant. In the example shown in FIG. 2, fiber segments extend between various gateways and amplifier huts, and fiber segments also extend between amplifier huts. In the present example, a span 26 involves one or more sequential or connected fiber segments. Thus, a span may include one segment (e.g., a single fiber segment between a gateway and an amplifier hut) or more than one segment (e.g., a fiber segment between a gateway and an amplifier along with the subsequent fiber segment between the gateway and the following amplifier hut). The maximum number of segments in a given span is limited by the number of segments that a wave can traverse without intermediate regeneration.

In the present case, each span starts and ends at some network node: either a gateway or an amplifier site. In the example network shown in FIG. 2, the total number of feasible spans is on the order of ~$10^4$. The system determines regeneration requirements in the network based upon the type and length of a chain of fiber spans to determine the maximum number of intermediate ROADMs that the span can tolerate before it becomes too noisy to remain feasible. While different methods exist to make this determination, in one example an array of noise values for each fiber segment and each ROADM are added together. The noise values are interpolated from a table of empirically-measured values for various fiber types and lengths.

Referring to the example network shown in FIG. 2, seven (7) gateways and 59 amplifier sites are shown. If it is assumed for the sake of example that the fiber quality allows no more than seven (7) fiber segments 20 between signal regenerations (i.e., a span is seven or less segments), then a span starting at gateway node A, for example, can stretch at most seven (7) segments in any direction toward gateway nodes B, C and E. FIG. 2 shows the 23 feasible spans that start at node A. Some of the longer spans may become infeasible if additional intermediate ROADMs are added.

Still referring to FIG. 2, if we assume that there is a request to establish a circuit from gateway node B to C to D to F, then if ROADMs are only placed at the gateways (B, C, D and F) this path requires three spans 26A-26C (gateway node B to gateway node C, gateway node C to gateway node D, and gateway node D to gateway node F). In this case, the spans between gateway nodes B and C, C and D, and D and F are suboptimal involving five segments 20BC, four segments 20CD and five segments 20DE, respectively. However, if a ROADM is placed at node 28 between C and D (seven segments from node B) and the signal regenerates only there, then the path can be connected with only two spans 26D and 26E (each of seven segments in this example), saving one costly signal regeneration.

FIG. 2 and the example presented above provide a relatively simple example of the general context of the solutions provided herein. In many conventional network implementations, ROADMs are simply provided at gateways where they are needed to add and drop network traffic and at numerous other ad hoc locations to ensure functionality. Such a solution is rarely optimal.

To achieve optimal placement of ROADM and regeneration devices in a network configuration, Models A and B are now discussed in more detail. Assume, for example, a binary variable $R_n$ associated with each node (e.g., gateway or amplifier) that specifies whether a ROADM will be placed at that respective node. Further assume, for example, a variable $S_s$ for each potential span that specifies whether the particular span represented by $S_s$ will be used to carry traffic. Further assume, for example, a variable $W_s$ that specifies the number of wavelengths span $S_s$ will carry. Further assume, for example, a variable $X_{sc}$ for each span-circuit pair that specifies whether span s carries circuit c. Each of these example variables are defined below.

Example Variables of Model A $R_n$=1 if node n has a ROADM, 0 if not (binary)
$S_s$=1 if span s is used, 0 if not (binary)
$X_{s,c}$=1 if span s carries circuit c, 0 if not (binary)
$W_s$=number of wavelengths carried by span s (integer)

Each node in the network is assigned the various possible variables. Through implementation of the model, the variables $R_n$, $S_s$, and $X_{s,c}$ are set to either a 1 or 0, and the $W_s$ variable is set to an integer value.

The following list identifies example parameters associated with Model A:

Example Parameters of Model A $C_n^R$=Cost of ROADM placement at node n
$C^W$=Cost of wavelength regeneration
$A_s$=Start node of span s
$Z_s$=End node of span s
$N_s$=Number nodes in span s
$R_s^{max}$=Maximum number of ROADMs in span s
$W^{max}$=Maximum number of wavelengths on a single segment
$B^{max}$=Maximum bandwidth of a single wavelength
$B_c$=Bandwidth requirement of circuit c
$A_c$=Start node of circuit c
$Z_c$=End node of circuit c Notations Used in Models A and B $P(a,z) \rightarrow$ Path from node a to z
$\in \rightarrow$ element of set
: $\rightarrow$ "such that"

The objective of using Model A in this example embodiment is to minimize the total cost of ROADMs and wavelength regenerations in the network. The model assumes that each wavelength on each span requires regeneration. The objective of Model A is as follows:

Model A Objective $$\text{Minimize } \sum_n C_n^R R_n + \sum_s C^W W_s$$

Model A may be constrained in various possible ways, some of which are set forth below. As such, the following is not an exhaustive list as more constraints, fewer constraints, one or more variations of these constraints, or any combination thereof, are contemplated for use by Model A in accordance with embodiments disclosed herein. The solution of Model A provides an optimal and feasible solution. However, by modifying the various constraints and other aspects of the model, other feasible solutions may be generated. For example, solving the model may identify a particular amplifier hut to locate a ROADM device. However, other amplifier hut locations, such as adjacent huts to either side of the identified hut, may also present feasible solutions for placement of the ROADM. Moreover, actual network implementation may deviate in some ways from the optimized solution generated through the disclosed model (s). For example, the models may generate a solution of identifying a particular hut for placement of a ROADM device. However, the amplifier hut is determined, at the time of installation, to be unsuitable for the ROADM and the installers install the ROADM at a nearby location separate from the identified hut.

Model A Constraints

Constraint set 1 specifies that each gateway requires a ROADM:

$$R_n=1, \text{ for all gateway nodes } n, \tag{1}$$

Constraint set 2 specifies that each span used to carry traffic has a ROADM at both endpoints:

$$S_s \leq R_{A_s}, \text{ and } S_s \leq R_{Z_s}, \text{ for all spans } s, \tag{2}$$

Constraint set 3 specifies that if a span is used to carry traffic, it may not have more than its maximum number of intermediate segments placed on its path. Stated differently, a span may not exceed a maximum number of ROADMs along the span above which a wavelength along the span would be degraded to a level rendering the span infeasible:

$$\sum_{n \in P(A_s, Z_s)} R_n \leq N_s - (N_s - R_s^{max} - 2)S_s, \tag{3}$$

for all spans s,

Constraint set 4 specifies that no span may carry more than its maximum number of wavelengths. Thus, for example, if a span can carry a maximum number of 40 wavelengths and the span is used ($S_s=1$), then the number of wavelengths carried by the span ($W_s$) must be 40 or less. Constraint set 4 is redundant with constraint set 5 in that it will always be satisfied by any integer feasible solution even if it is excluded, but it makes the model easier to solve by eliminating many fractional solutions from consideration.

$$W_s \leq W^{max} S_s, \text{ for all spans } s, \tag{4}$$

Constraint set 5 specifies that overlapping spans can carry no more than $W^{max}$ (e.g., 40) waves combined. Spans that overlap with other spans on a common fiber segment can only carry a combined number of wavelengths that is the same or less than the total number that the segment can carry. Thus, for example, if two spans pass between the same amplifier huts and use the same segment of fiber, then the combined number of wavelengths on the spans cannot exceed the capability of the fiber.

$$\sum_{s: e \in P(A_s, Z_s)} W_s \leq W^{max}, \tag{5}$$

for all segments e,

Constraint 6 specifies that no span can carry more total circuit bandwidth than the combined bandwidth of all of its wavelengths:

$$\sum_c B_c X_{s,c} \leq B^{max} W_s, \tag{6}$$

for all spans s,

Constraint 7 specifies that each circuit traverses a connected chain of spans from its start to its end point:

$$\sum_{s:A_s=n} X_{s,c} - \sum_{s:Z_s=n} X_{s,c} = \begin{cases} 1, & \text{if } n = A_c \\ -1, & \text{if } n = Z_c, \\ 0, & \text{otherwise} \end{cases} \tag{7}$$

for all spans s.

1.2. Model B: Wavelength Selection

Similar to Model A, Model B includes $W^{max}$ possible wavelengths over which circuits may travel on a single fiber. The objective of Model B is to specify, for a given solution to Model A, the indices of the specific wavelengths (colors) which should be used on each segment. In an example embodiment, the indices according to Model B are selected so that no two overlapping spans share a wavelength of the same index. The following list identifies example variables used in Model B:

Model B Variables $L_{s,w}=1$ if span s is lit with wavelength w, 0 if not

In this particular embodiment, the Model B objective is relatively less important as its main purpose is for constraint satisfaction. However, a preference for lower-indexed wavelengths is included when possible. The Model B objective is represented as follows:

Model B Parameters $W_s$=Number of wavelengths carried by span s (from solution to Model A)

Model B Objective $$\text{Minimize } \sum_s w L_{s,w}$$

Various example constraints can be employed by Model B. The constraints identified below do not represent an exhaustive list and are presented for the purpose of example only. As such, more constraints, fewer constraints, one or more variations of these constraints, or any combination thereof, are contemplated for use by Model B in accordance with embodiments disclosed herein. The solution of Model B provides an optimal and feasible solution but other feasible solutions are possible.

Model B Constraints

Constraint 1 specifies that each edge may only have one span passing through it that carries each wavelength index:

$$\sum_{s:e \in P(A_s,Z_s)} L_{s,w} \leq 1, \quad (1)$$

for all segments e, wavelengths w,

Constraint 2 specifies that the number of selected wavelength indices for each span should be the number specified by $W_s$ in the solution to Model A:

$$\sum_w L_{s,w} = W_s, \quad (2)$$

for all spans s.

Figure 3:
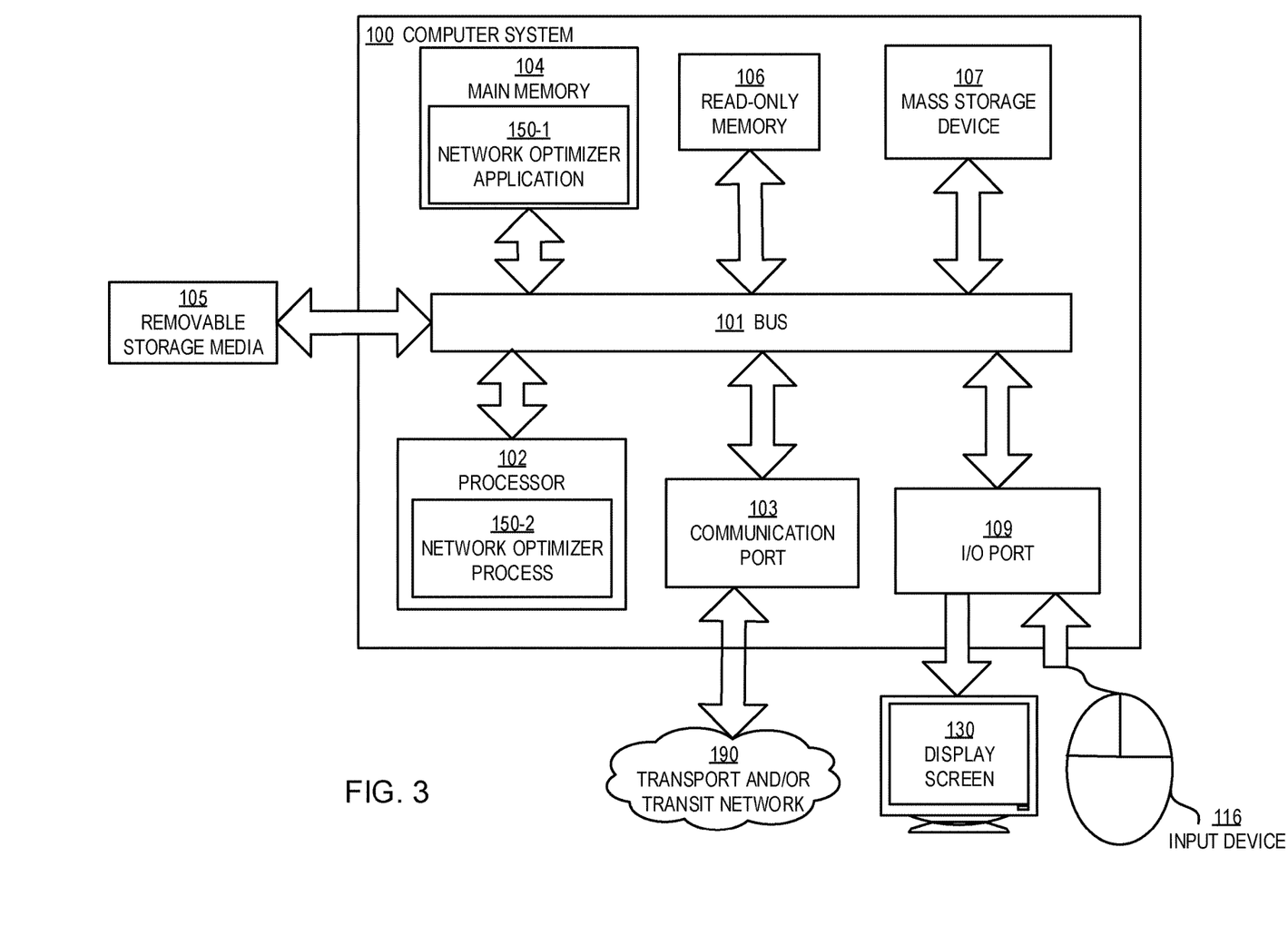
FIG. 3 is a block diagram of a computer system suitable for performing methods and implementing systems in accordance with an example embodiment.

FIG. 3 is a schematic diagram of a computer system 100 upon which embodiments of the present disclosure may be carried out and implemented. According to the present example, the computer system 100 includes a bus 101 (i.e., interconnect), at least one processor 102, at least one communications port 103, a main memory 104, a removable storage media 105, a read-only memory 106, and a mass storage 107. Processor(s) 102 can be any known processor, such as, but not limited to, an Intel® Itanium® or Itanium 2® processor(s), AMD® Opteron® or Athlon MP® processor(s), or Motorola® lines of processors. Communications ports 103 can be any of an RS-232 port for use with a modem based dial-up connection, a 10/100 Ethernet port, a Gigabit port using copper or fiber, or a USB port. Communications port(s) 103 may be chosen depending on a network such as a Local Area Network (LAN), a Wide Area Network (WAN), or any network to which the computer system 100 connects. The computer system 100 may be in communication with peripheral devices (e.g., display screen 130, input device 116) via Input/Output (I/O) port 109.

Main memory 104 can be Random Access Memory (RAM), or any other dynamic storage device(s) commonly known in the art. Read-only memory 106 can be any static storage device(s) such as Programmable Read-Only Memory (PROM) chips for storing static information such as instructions for processor 102. Mass storage 107 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 101 communicatively couples processor(s) 102 with the other memory, storage and communications blocks. Bus 101 can be a PCI/PCI-X, SCSI, or Universal Serial Bus (USB) based system bus (or other) depending on the storage devices used. Removable storage media 105 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process, such as the various network optimization methods and any discrete operations discussed herein. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 104 is encoded with network optimizer application 150-1 that supports functionality as discussed herein. Network optimizer application 150-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 102 accesses main memory 104 via the use of bus 101 in order to launch, run, execute, interpret or otherwise perform the logic instructions of the network optimizer application 150-1. Execution of network optimizer application 150-1 produces processing functionality in network optimizer process 150-2. In other words, the network optimizer process 150-2 represents one or more portions of the network optimizer application 150-1 performing within or upon the processor(s) 102 in the computer system 100.

It should be noted that, in addition to the network optimizer process 150-2 that carries out method operations as discussed herein, other embodiments herein include the network optimizer application 150-1 itself (i.e., the un-executed or non-performing logic instructions and/or data). The network optimizer application 150-1 may be stored on a computer readable medium (e.g., a repository) such as a floppy disk, hard disk or in an optical medium. According to other embodiments, the network optimizer application 150-1 can also be stored in a memory type system such as in firmware, read only memory (ROM), or, as in this example, as executable code within the main memory 104 (e.g., within Random Access Memory or RAM). For example, network optimizer application 150-1 may also be stored in removable storage media 105, read-only memory 106, and/or mass storage device 107.

As discussed herein, embodiments of the present disclosure include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

Figure 4:
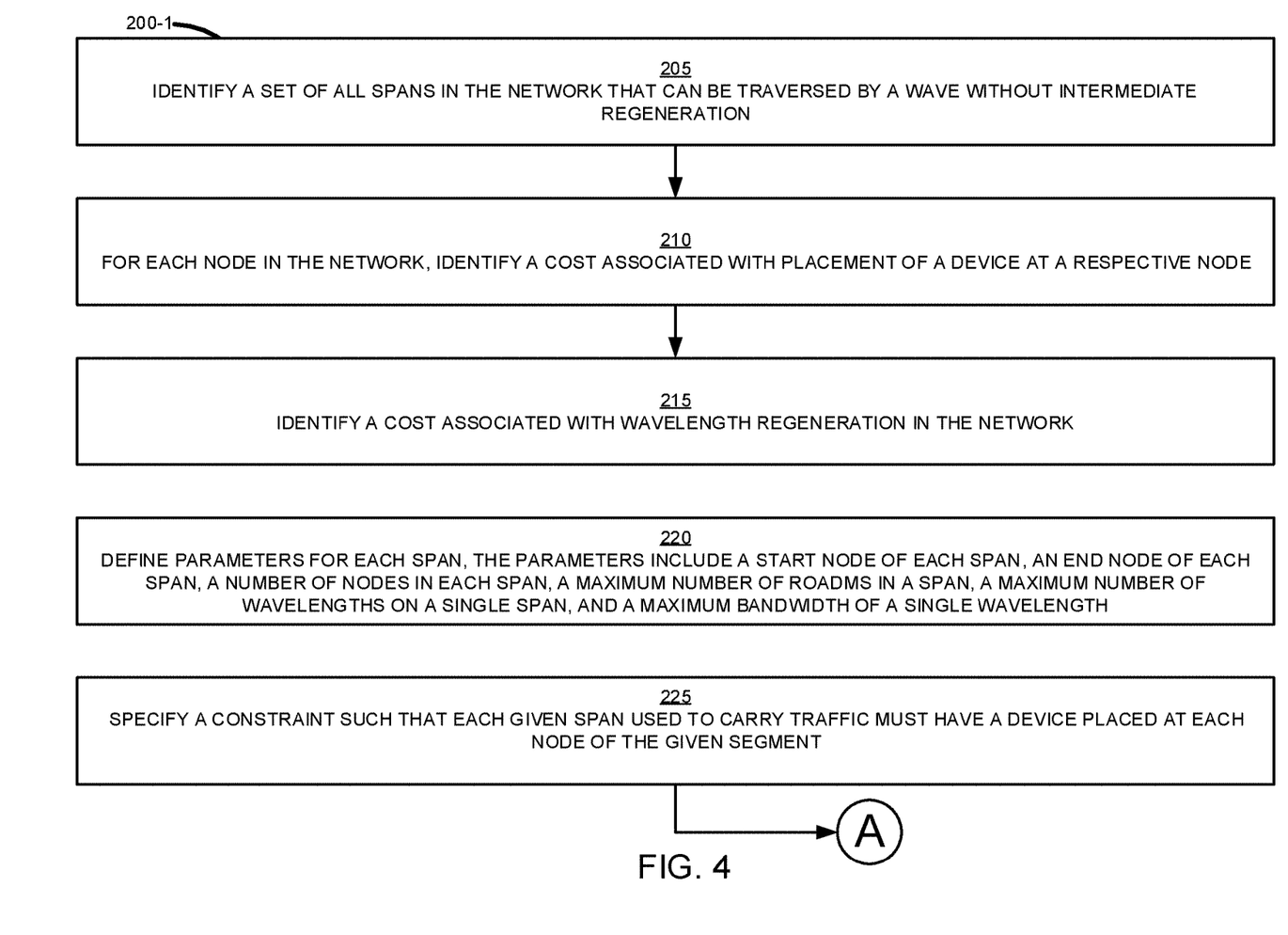
FIG. 4 is a flow chart that shows processing operations performed by a network optimizer in accordance with an example embodiment.
Figure 5:
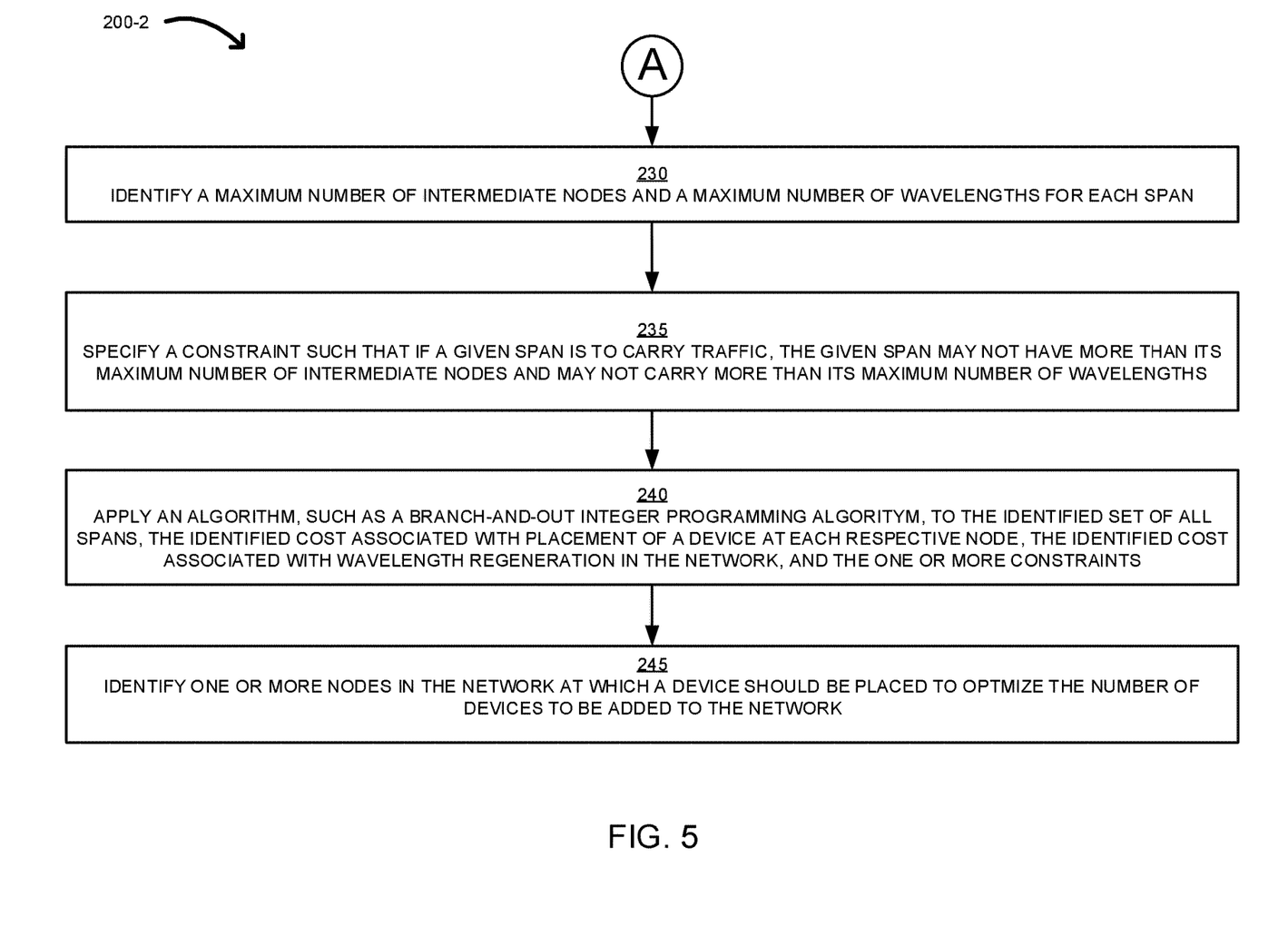
FIG. 5 is a flow chart that shows processing operations performed by a network optimizer in accordance with an example embodiment.

FIGS. 4 and 5 are a flowchart of one possible method according to embodiments herein. The rectangular elements are herein denoted as "steps" and represent computer software instructions or groups of instructions that carry out such functions. The flow diagrams do not necessarily depict the syntax of any particular programming language. Rather, the flow diagrams illustrate the functional information one of ordinary skill in the art could use to fabricate circuits or to generate computer software (or a hybrid of both circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Now, more specifically, FIGS. 4 and 5 show a flow chart (i.e., flowcharts 200-1 and 200-2) of processing steps representing processing operations performed by the network optimizer 150 (i.e., network optimizer application 150-1 and/or the run-time implementation of network optimizer process 150-2) in accordance with one example embodiment. It should be noted that the various operations may be added, removed, or reordered, depending on a given implementation.

In step 205, the network optimizer 150 identifies various possible spans in a network that can be traversed by a wave without regeneration. In one particular example, the optimizer 150 identifies a set of all spans in a particular network, or portion of a network, that can be traversed by a wave without intermediate regeneration. A span may involve one or more segments of fiber residing between nodes, e.g., amplifier huts and gateways, in the network. For example, referring to FIG. 2, numerous possible spans 26 are shown. One will recognize that other spans also exist but are not specifically referenced in the drawing to purposes of clarity.

In step 210, for each node in the network, the network optimizer 150 identifies a cost associated with placement of a device (e.g., a ROADM) at a respective node. In one possible example, the network optimizer accesses a database populated with information concerning the costs associated with deploying a ROADM device. The costs may include the cost of device itself, installation costs (which may vary depending on geographic location and other factors), power costs, etc. Alternatively, the network optimizer receives input from a user concerning the costs associated with placement of a ROADM at a node.

In step 215, the network optimizer 150 identifies a cost associated with wavelength regeneration in the network. As with ROADM costs, the network optimizer may obtain costs associated with wavelength regeneration in the network from a database populated with the costs associated with placement of regeneration equipment in a network. The costs may include the cost of the regeneration device or devices themselves, installation costs (which may vary depending on geographic location and other factors), space, power and cooling costs, monitoring and maintenance costs, etc. Alternatively, the network optimizer receives input from a user concerning the costs associated with regeneration equipment.

The cost parameters identified or otherwise obtained in steps 210 and 215 are shown as parameters for Model A and form part of the objective of Model A. By solving Model A, for example, with the identified constraints (1)-(7) (e.g. optimizers 150-1 or 150-2), the system may identify or otherwise define a network with an optimal number and location of ROADM devices and/or regeneration devices. The system may also identify where in an existing network, or portion of a network, to optimally place ROADM and/or regeneration devices. The system may further solve Model B either alone or integrated with Model A as a part of the solutions. The optimal solutions account for the costs identified in steps 210 and 215.

Continuing with FIG. 4, step 220, the network optimizer identifies one or more parameters for each span in the network. As discussed herein concerning the parameters of Model A, the network optimizer identifies a start node for each span and an end node for each span. Referring to FIG. 2, a span may include a start node of one of the various gateways A-F and an end node of one of the various amplifier huts (sites) 22, in one example. The network analyzer further determines the number of nodes in a given span. So, for example, referring to span 26A discussed herein, there are six nodes in the span, with gateway nodes B and C at either end of the span, and four amplifier site nodes 22 between the gateway nodes. For each span, the network optimizer identifies the maximum number of ROADMs that the span may include, the maximum number of wavelengths that the span may carry, and the maximum bandwidth of a single wavelength.

In step 225, the network optimizer 150 specifies a constraint (e.g., to be used in conjunction with a linear and/or integer programming algorithm implementing the Model A or Model B objective, or a combination of the two) such that each given span used to carry traffic has a device placed at each node of the given segment. The network optimizer specifies that each gateway node in the network requires a ROADM device. Thus, for example, the $R_n$ variable of Model A is set to 1 for any network node associated with a gateway. The network optimizer further specifies that each span used to carry traffic should have a ROADM device at either end node of the span. Stated differently, the $R_n$ variable for the start and end nodes of a span carrying traffic are set to 1.

In step 230 (see FIG. 5), for each span, the network optimizer 150 identifies a maximum number of intermediate nodes and a maximum number of wavelengths for the given span. For the intermediate node constraint, the constraint is only used when the span carries traffic. Then, the constraint specifies that the span may not exceed a number of ROADM devices that would cause the span to become infeasible due to signal degradation. The network analyzer assesses span and segment lengths, ROADM signal degradation models or standards, and other information in order to determine the maximum number of nodes for a span. Additionally, the network optimizer specifies that no span may carry more than its maximum number of wavelengths. Thus, if the network carries up to 40 wavelengths or 80 wavelengths on a span, for example, then the solution is constrained to require no more than 40 or 80 wavelengths on a span.

In step 235, the network optimizer 150 specifies a constraint (e.g., to be used in conjunction with a linear and/or integer programming algorithm) such that if a given segment is to carry traffic, the given segment may not have more than its maximum number of intermediate nodes and may not carry more than its maximum number of wavelengths. Step 235 is somewhat redundant with step 230. However, a redundant constraint may eliminate unnecessary solutions of the linear relaxation (the same model without constraints) such that the system 100 (or other systems) can solve the model more quickly than it would without the redundant constraint.

In step 240, the network optimizer 150 may apply a standard branch-and-cut integer programming algorithm to the identified set of all segments, the identified cost associated with placement of a device at each respective node, the identified cost associated with wavelength regeneration in the network, and the one or more constraints. Note that the algorithm may be applied to fewer constraints, additional constraints, or any combination of constraints thereof, in accordance with embodiments described herein. In one particular example, the network optimizer solves Model A using the variables, constraints, and parameters defined herein. Subsequently, the network optimizer solves Model B using the variable, constraints, and parameters defined herein.

In step 245, the network optimizer 150 identifies, from the algorithm, one or more nodes in the network at which a device (e.g., ROADM) should be placed to optimize the number of devices to be added to the network (e.g. to, minimize or otherwise reduce the cost of placing additional devices in the network).

The models and associated linear programming methods may be executed on a computer system (e.g., computer system 100). Furthermore, the network optimizer 150 can render, on a graphical user interface (e.g., via display screen 130), an indication of the one or more nodes in the network at which a device should be placed to minimize the number of devices to be added to the network (i.e., in response to execution of the algorithm as described above). The network may then be deployed, upgraded, or otherwise modified to include ROADM devices and/or regeneration devices at or substantially near the defined optimal ROADM locations.

Although aspects of the present invention have been described with reference to various embodiments, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A computer-implemented method for optimizing placement of devices at nodes in a network, wherein at least one of the devices is a reconfigurable optical add-drop multiplexer (ROADM), the computer-implemented method comprising:
    using at least one processor,
    identifying a plurality of spans in the network that can be traversed by a wave without intermediate regeneration;
    specifying a constraint such that if a given span is to carry traffic, the given span may not:
        have more than an identified maximum number of intermediate nodes for the given span; and
        carry more than a maximum bandwidth for the given span;
    specifying a constraint such that each node that comprises a gateway also comprises a ROADM;
    specifying a constraint such that each span that is overlapping with another span can carry no more than a maximum number of wavelengths on a single span waves, combined;
    specifying a constraint such that no span can carry more total circuit bandwidth than the combined bandwidth of all of the spans wavelengths;
    specifying a constraint such that each circuit traverses a connected chain of spans from a start point to the chain to an end point of the chain;
    applying at least one first linear programming model to a forecasted traffic demand, the identified spans and the one or more specified constraints;
    applying at least one second linear programming model to specify indices of specific wavelengths to be used on each span such that any of the overlapping spans do not share a wavelength of an index of the overlapping span; and
    identifying, from the model, one or more nodes in the network at which a device should be placed.

2. The computer-implemented method as recited in claim 1, wherein at least one given node in the network comprises an amplifier site.

3. The computer-implemented method as recited in claim 2, further comprising:
    on a graphical user interface associated with the processor, rendering an indication of the one or more nodes in the network at which a device should be placed.

4. A networking apparatus for optimizing placement of devices at nodes in a network, wherein at least one of the devices is a reconfigurable optical add -drop multiplexer (ROADM), comprising:
    a processing device; and
    a non-transitory computer-readable medium encoded with instructions that when executed by the processing device cause the processing device to:
        identify a plurality of spans in the network that can be traversed by a wave without intermediate regeneration;
        specify a constraint such that if a given span is to carry traffic, the given span may not:
            have more than an identified maximum number of intermediate nodes for the given span; and
            carry more than a maximum bandwidth for the given span;
        specify a constraint such that each node that comprises a gateway also comprises a ROADM;
        specify a constraint such that each span that is overlapping with another span can carry no more than a maximum number of wavelengths on a single span waves, combined;
        specify a constraint such that no span can carry more total circuit bandwidth than the combined bandwidth of all of the spans wavelengths;
        specify a constraint such that each circuit traverses a connected chain of spans from a start point to the chain to an end point of the chain;
        apply at least one first linear programming model to a forecasted traffic demand, the identified spans and the one or more specified constraints;
        apply at least one second linear programming model to specify indices of specific wavelengths to be used on each span such that any of the overlapping spans do not share a wavelength of an index of the overlapping span; and
        identify, from the model, one or more nodes in the network at which a device should be placed.

5. The networking apparatus as recited in claim 4, wherein at least one given node in the network comprises an amplifier site.

6. The networking apparatus as recited in claim 5, the instructions that when executed by the processing device further cause the processing device to render, on a graphical user interface associated with the processing device, an indication of the one or more nodes in the network at which a device should be placed.

* * * * *